United States Patent [19]

Mailloux et al.

[11] Patent Number: 5,066,047
[45] Date of Patent: Nov. 19, 1991

[54] PROCESS FOR INCORPORATING HOLOGRAM INTO LAMINAR STRUCTURE WITH PHOTOGRAPH

[75] Inventors: Dennis R. Mailloux, Westminster, Mass.; Harry A. Smith, Nashua, N.H.; Neal F. Kelly, Woburn, Mass.

[73] Assignee: Polaroid Corporation, Cambridge, Mass.

[21] Appl. No.: 577,778

[22] Filed: Sep. 5, 1990

[51] Int. Cl.⁵ .............................................. B42D 15/00
[52] U.S. Cl. ..................................... 283/86; 283/77; 283/94; 283/904; 283/108
[58] Field of Search .................. 283/77, 86, 94, 98, 283/904, 108

[56] References Cited

U.S. PATENT DOCUMENTS

| | | | |
|---|---|---|---|
| 2,361,670 | 10/1944 | Whitehead | 40/2.2 |
| 2,983,606 | 5/1961 | Rogers | 96/29 |
| 3,313,052 | 4/1967 | Malster | 40/2.2 |
| 3,438,835 | 4/1969 | Chen et al. | 156/522 |
| 3,498,788 | 3/1970 | Haas | 96/76 |
| 3,581,416 | 6/1971 | Andrews | 40/2.2 |
| 3,581,417 | 6/1971 | Andrews | 40/2.2 |
| 3,582,439 | 6/1971 | Thomas | 161/5 |
| 3,614,839 | 10/1971 | Thomas | 40/2.2 |
| 3,644,116 | 2/1972 | Andrews et al. | 96/29 |
| 3,647,442 | 3/1972 | Malster | 96/29 |
| 4,101,701 | 7/1978 | Gordon | 428/189 |
| 4,119,361 | 10/1978 | Greenaway | 350/1.1 |
| 4,305,215 | 12/1981 | Smith | 40/1.5 |
| 4,322,461 | 3/1982 | Raphael et al. | 428/14 |
| 4,330,350 | 5/1982 | Andrews | 156/152 |
| 4,415,225 | 11/1983 | Benton et al. | 350/3.84 |
| 4,445,749 | 5/1984 | Benton | 350/376 |
| 4,498,729 | 2/1985 | Benton | 350/3.69 |
| 4,535,041 | 8/1985 | Fielding et al. | 430/1 |
| 4,573,711 | 3/1986 | Hyde | 283/98 |
| 4,588,664 | 5/1986 | Fielding et al. | 430/1 |
| 4,592,976 | 6/1986 | Whitehead | 283/77 X |
| 4,597,814 | 7/1986 | Colgate | 156/219 |
| 4,684,795 | 8/1987 | Colgate | 235/437 |
| 4,696,876 | 9/1987 | Cael | 430/1 |
| 4,773,677 | 9/1988 | Plasse | 283/77 |
| 4,921,319 | 5/1990 | Mallik | 283/86 X |
| 5,002,312 | 3/1991 | Phillips et al. | 283/77 X |
| 5,010,243 | 4/1991 | Fukushima et al. | 283/86 X |

FOREIGN PATENT DOCUMENTS

| | | | |
|---|---|---|---|
| 0312479 | 4/1989 | European Pat. Off. | 283/86 |
| 8910847 | 11/1989 | World Int. Prop. O. | 283/77 |

*Primary Examiner*—Paul A. Bell
*Attorney, Agent, or Firm*—David J. Cole

[57] ABSTRACT

A laminar structure, for example an identity card, comprises a photograph and a supported hologram. A moisture-impermeable barrier layer and an adhesive layer are disposed between the hologram and the photograph, so that the photograph can be secured to the hologram while the former is still wet. The supported hologram, the barrier and adhesive layers and the photograph are sandwiched between first and second sheets. The hologram is sufficiently adhered to the photograph that, if an attempt is made to separate the supported hologram from the photograph, fracture will occur within the hologram or between the hologram and its support sheet, so that at least part of the hologram will remain attached to the photograph, so that it is not possible to detach the hologram from the photograph, leaving the hologram attached to the first sheet, and thus substitute a different photograph in the laminar structure.

31 Claims, 1 Drawing Sheet

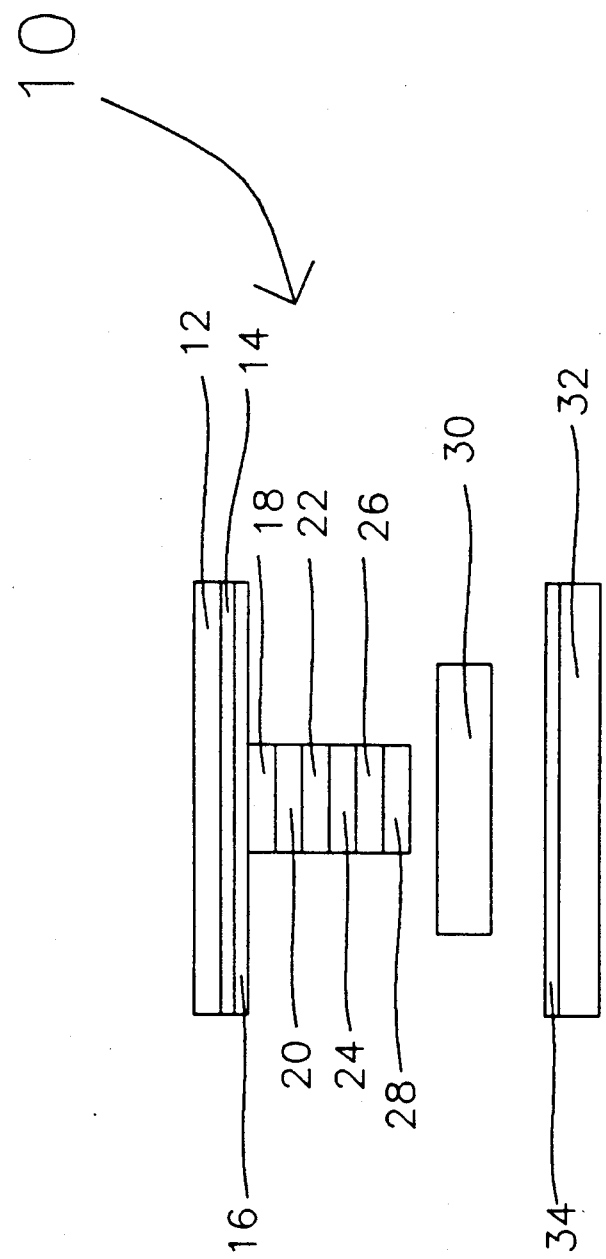

PROCESS FOR INCORPORATING HOLOGRAM INTO LAMINAR STRUCTURE WITH PHOTOGRAPH

BACKGROUND OF THE INVENTION

This invention relates to a process for incorporating a hologram into a laminar structure with a photograph, and to a laminar structure so produced.

Laminar structures in the form of identification cards or badges which carry a photograph or other personalized information pertaining to the bearer are commonplace and have many recognized security and identification applications. Identification cards or badges, which may be worn on the person or carried by the card bearer, are disclosed, for example, in U.S. Pat. No. 2,361,670 (issued Oct. 31, 1944 to N. Whitehead); in U.S. Pat. No. 3,313,052 (issued Apr. 11, 1967 to R. L. Malster); and in U.S. Pat. No. 4,305,215 (issued Dec. 15, 1981 to S. C. Smith).

Such identification cards are often produced by laminating a photograph of the person authorized to use the identity card between two sheets of plastic or similar material. For example, U.S. Pat. No. 4,322,461, issued Mar. 30, 1982, describes an identity card structure and a method for the preparation thereof using a transferred adhesive. The laminar structures comprise a color diffusion transfer photographic print bonded to a vinyl sheet using an adhesive mixture of a vinyl acetate-ethylene copolymer and a hydroxylated polymer, and are prepared using an adhesive-supporting carrier sheet.

U.S. Pat. No. 4,101,701, issued July 18, 1978, describes an identity or credit card and a laminar assembly for preparing same. A layer comprising specific ethylene copolymers or mixtures thereof and a layer comprising a hydroxylated polymer is stated to be an especially effective heat-activateable adhesive in such cards.

U.S. Pat. No. 3,647,442, issued Mar. 7, 1972, describes a laminar structure comprising a diffusion transfer color photographic image on a stratum comprising a mixture of polyvinyl pyridine and polyvinyl alcohol, the surface of the stratum being bonded to the surface of a transparent layer of sheet material, and an identification card including such a laminar structure. into the card while wet (see column 3, lines 1-15).

U.S. Pat. No. 3,644,116, issued Feb. 22, 1972, describes a laminar structure comprising a photographic image in silver laminated to a transparent layer through or via a layer comprising a water-activated plasticized vinyl acetate polymer. The water-activated polymer is coated on the transparent layer, which is then dried. The photograph can be laminated wet (see column 4, line 65 to column 5, line 26).

(The term "wet" is used in the two preceding patents and in the present application to refer to a photograph which has just been developed and which thus has a high moisture content. When the photograph is produced using a diffusion transfer photographic process such as that described in U.S. Pat. No. 2,983,606, the wet photograph may also bear on its surface the residue of the processing composition used to develop the diffusion transfer photograph.)

U.S Pat. No. 3,582,439, issued June 1, 1971, and U.S. Pat. No. 3,614,839, issued Oct. 26, 1971, describe an identity card in which a laminar structure comprises a color photograph bonded to a sheet of vinyl through an ethylene-vinyl acetate copolymer tie coat.

U.S. Pat. No. 3,581,417, issued June 1, 1971, describes a novel product intended for use in, inter alia, an identity card, this product comprising an adhesive coated polyester film laminated to a cellulose ester through a tie-coat consisting essentially of plasticized nitrocellulose.

Attempts have also been made to incorporate holograms into identity cards and similar laminar structures, since holograms are inherently difficult to reproduce and thus render more difficult the counterfeiting of, or tampering with, the identity card. For example, U.S. Pat. No. 4,684,795, issued Aug. 4, 1987, describes an identification card and method of manufacturing the same in which a holographic image is embossed on a clear polyester carrier which is then coated with ferrous oxide to form a magnetic strip with an optically viewable holographic image thereon. The strip is then mounted on a plastic substrate, and the carrier discarded.

U.S. Pat. No. 4,597,814, issued July 1, 1986, describes a method of manufacturing an identification card whereby information is printed on a sheet of plastic material. A raised pattern is formed on a different sheet of material to create a holographic image. The resultant raised pattern sheet is attached to the surface of the sheet of plastic material by pressure sensitive adhesive. The surface of the plastic material is overlaminated with a transparent layer to form a sandwich, and heat and pressure are applied to fuse the overlaminated layers. The pattern sheet has a high melting point so that the image is viewed as three-dimensional through an overlaminated layer.

U.S Pat. No. 4,573,711, issued Mar. 4, 1986, describes a method of manufacturing a credit card including the fabrication of a plurality of plastic credit cards, as in sheet form, and then severing such cards into individual personal cards with coded information thereon for identifying the person or account to which the cards relate. Printed on such card is indicia indicating the card is "void". Fabricated separately from the respective cards are strips of hologram material which are sized to act as covers for overlying the "void" indicia and which incorporate optical images which may be characteristic of a particular account or institution to indicate the card is currently active. The indicia covers are stored separate from the cards and are only applied thereto as a last step prior to shipment of the cards from the place of storage to the customer. Consequently, any unauthorized person who gains possession of the cards without the accompanying hologram covers will find the cards ineffective for making unauthorized transactions relating to the accounts identified by such cards.

In commercial systems, it is highly desirable that an identity card or similar laminar structure be capable of being assembled using a wet photograph. Commercial "instant" or "on-the-spot" identity card issuance systems are typically employed to provide an identity card for immediate use. Such systems are typically based on color photographs from diffusion transfer photographic film units. Thus, the intended bearer of an identity card will report to an identity card issuance station where appropriate photographic materials and equipment are assembled. A data card containing personalized information relating to the bearer is prepared, usually by adding such information to a preprinted data card bearing information pertaining to the card issuing authority or association. The data card and the bearer are photographed simultaneously with a camera unit employing diffusion transfer photographic film, the film immediately developed and the identity card handed to its bearer. Such a system minimizes the time required of the bearer and the technician operating the equipment, and provides the maximum security since both the bearer and the technician can check that the card has been properly prepared. If the system cannot incorporate a wet photograph into the identity card, the preparation of the card must be delayed until the photograph has dried (with consequent increased loss of time of the bearer and the technician), or the apparatus used to prepare the card must incorporate a drying section for rapidly drying the photograph so that it can be incorporated into the identity card. The provision of such a drying section increases the complexity and cost of the apparatus used to prepare the card.

However, there are two problems which one must overcome to produce a secure laminar structure containing a wet photograph, a hologram and two sheets of material between which the photograph and the hologram are sandwiched. If one attempts to bond a hologram to a wet photograph, the water absorbed from the photograph will destroy the image of the hologram. In addition, if the hologram bonds to one of the sheets more strongly than it bonds to the photograph, it might be possible for a counterfeiter or tamperer to separate the photograph from the hologram, leaving the hologram attached to one of the sheets, and substitute a different photograph, thereby producing an apparently-authentic laminar structure with the proper hologram displayed.

Accordingly, there is a need for a process which permits a hologram to be incorporated into a laminar structure together with a wet photograph in such a manner that it is not possible to separate the hologram from the photograph and leave the hologram intact and attached to the sheets forming the outer surfaces of the laminar structure, and this invention provides such a process.

SUMMARY OF THE INVENTION

This invention provides a process for incorporating a supported hologram (comprising a hologram disposed on a support sheet) into a laminar structure which also comprises first and second sheets and a wet photograph, at least a portion of the first sheet being substantially transparent. This process comprises:
  providing on the surface of the hologram remote from the support sheet a substantially moisture-impermeable barrier layer; providing, on the opposed side of the barrier layer from the hologram, an adhesive layer capable of adhering the hologram and barrier layer to a wet photograph; bringing together the first and second sheets, the wet photograph, the supported hologram and the barrier and adhesive layers with the photograph being disposed adjacent the second sheet, the adhesive layer being disposed adjacent the photograph and the supported hologram being disposed adjacent the first sheet; and laminating the first and second sheets, the wet photograph, the supported hologram and the barrier and adhesive layers together, such that the first and second sheets are bonded together and the hologram and the photograph can be viewed through the substantially transparent part of the first sheet, and the hologram becomes sufficiently adhered to the photograph that if an attempt is made to separate the hologram from the photograph, fracture will occur within the hologram or between the hologram and the support sheet, so that at least part of the hologram will remain attached to the photograph. structure comprising:

This invention also provides a laminar
  a first sheet at least a portion of which is substantially transparent;
  a supported hologram comprising a hologram disposed on a support sheet with the support sheet disposed adjacent one surface of the first sheet;
  a substantially moisture-impermeable barrier layer secured to the surface of the hologram remote from the support sheet;
  a photograph;
  an adhesive layer lying between and adhered to the photograph and the barrier layer, the adhesive layer comprising a material capable of adhering the barrier layer to the photograph while the photograph is still wet; and
  a second sheet adhered to the first sheet such that the supported hologram, barrier layer, adhesive layer and photograph lie between the first and second sheets,
  such that the hologram and the photograph can be viewed through the substantially transparent part of the first sheet, and the hologram is sufficiently adhered to the photograph that if an attempt is made to separate the hologram from the photograph, fracture will occur within the hologram or between the hologram and the support sheet, so that at least part of the hologram will remain attached to the photograph.

BRIEF DESCRIPTION OF THE DRAWING

The sole Figure of the accompanying drawing is a schematic side elevation of a laminar structure of the present invention as it is being assembled.

DETAILED DESCRIPTION OF THE INVENTION

As already mentioned, in the process of the present invention, a laminar structure is produced from first and second sheets, a hologram and a wet photograph. To enable the photograph to be incorporated into the laminar structure while the photograph is still wet, a substantially moisture-impermeable barrier layer is provided on one surface of the hologram; this barrier layer prevents moisture from the wet photograph from reaching and damaging the hologram.

Although other types of hologram may be used in the present process, the hologram is desirably a volume hologram, preferably a reflection phase volume hologram. Holograms suitable for use in the present invention, and processes for their production, are described in U.S. Pat. Nos. 4,415,225; 4,445,749 and 4,498,729. Photopolymerizable compositions for use in the production of such holograms are described in U.S. Pat. Nos. 4,588,664 and 4,696,876, while a process for stabilizing such holograms is described in U.S. Pat. No. 4,535,041. These holograms are usually less than 10 microns thick, typically only about 6 microns thick, and consequently highly fragile. Such holograms are in practice produced as supported holograms in which the hologram itself is produced upon and adhered to a support sheet, which is typically a synthetic resin film only about 1 to 2 mils (25 to 50 microns) thick. When such a supported hologram is used in the laminar structure of the present invention, desirably a support sheet adhesive layer is provided on the opposed side of the support sheet from the hologram, such that after the lamination the support sheet and the hologram are adhered to the first sheet by the support sheet adhesive layer. The supported hologram and the barrier layer may be adhered to the first sheet prior to the lamination operation, so that to assemble the laminar structure it is only necessary to bring the first and second sheets and the photograph together, and effect the lamination. Thus, the lamination operation itself becomes essentially identical to that required to produce a similar laminar structure without a hologram, and existing lamination apparatus can be used to produce the present laminar structure.

As already explained, in the process of the present invention, the hologram must become sufficiently adhered to the photograph that, if an attempt is made to separate the hologram from the photograph, fracture will occur within the hologram or between the hologram and its support sheet, so that at least part of the hologram will remain attached to the photograph. To ensure that the laminar structure does fail in this manner, it is desirable that the hologram not adhere to the support sheet too strongly.

It is preferred to use in the support sheet adhesive layer a low melting polyester type adhesive, for example that sold commercially as National Starch Adhesive 72-9672.

In the present process, it has been found desirable to use a support sheet which is as thin as possible, since such a thin support sheet minimizes distortion of the laminar structure caused by incorporation of the supported hologram. Preferably, the support sheet has a thickness in the range of about 6 to about 80 microns. The support sheet may be formed of a polyester, for example polyethylene terephthalate; such polyethylene terephthalate films display only poor adhesion to holograms. Polyethylene terephthalate films of the appropriate thickness are available commercially; for example from ICI Americas, Inc. of Wilmington, Del. As is well-known to those skilled in the art, such films may require the provision of a sub-coat or corona treatment to provide the proper surface characteristics for use in laminar structures such as those of the present invention. The presence of the thin support sheet is barely noticeable in the final laminar structure.

As already mentioned, the support sheet desirably does not exceed about 80 microns in thickness. Such a thin support sheet is relatively fragile and poses handling difficulties in some types of machinery. Accordingly, in practice a plurality of holograms and their associated support sheets may often be supplied releasably mounted upon a thicker backing material, typically a plastic film 5 to 10 mils thick, so that the holograms and their support sheets can be detached individually from the tape backing as needed. It is not recommended that such backing material be incorporated into the laminar structure of the invention, since the presence of a thick layer of backing material within the laminar structure may cause undesirable distortion of the structure.

The barrier layer used in the present process must have low transmission of water vapor to prevent water from the wet photograph damaging the hologram, and should be substantially transparent, since the hologram and the photograph are viewed through the transparent portion of the first sheet, and hence the photograph is viewed through the barrier layer. The barrier layer must adhere to both the hologram and the photograph, but should not be so strong a layer that a counterfeiter or tamperer could, by grasping the barrier layer, peel apart the photograph and the hologram. To meet all these requirements, it is preferred that the barrier layer be formed from either (a) a polyvinylidene polymer, desirably a copolymer of vinylidene chloride with vinyl chloride, acrylonitrile or a methacrylate, or (b) a chlorofluorocarbon polymer, preferably a polychlorotrifluoroethylene, for example that sold under the tradename "ACLAR" by Allied Chemical Corporation of Morristown N.J. When a chlorofluorocarbon polymer is used, it is often necessary to provide a priming layer on the surface of the barrier layer facing the photograph in order to provide the barrier layer with surface characteristics which enable it to be securely adhered to the wet photograph. An appropriate priming layer material has been found to be an epoxy polyethylene imine adduct.

The thickness of the barrier layer desirably does not exceed about 2 mil, and is preferably about 0.75 mil.

Although in theory the hologram could be secured to the barrier layer in other ways, it is normally necessary to provide a hologram/barrier adhesive layer between the hologram and the barrier layer. The adhesive used in this hologram/barrier layer should be heat-activateable, and must be chosen so that it will not flow into the interstices of a hologram during the lamination, since flow of the adhesive into the hologram will destroy the optical properties of the hologram. Polyester and ethylene vinyl acetate adhesives are preferred for use in the hologram/barrier layer, and examples of appropriate materials include National Starch Adhesive 72-9672, Bostick S188-711E and Adcoat X-17-77 (sold by the Morton Chemical Division of Morton Thiokol Corporation).

Although the hologram/barrier adhesive layer must attach at least part of the hologram securely to the barrier layer, it is not necessary that this adhesive layer cover the whole of the hologram. The hologram/barrier adhesive layer may cover only part of the surface of the hologram facing the barrier layer, so that if after the lamination the hologram and the photograph are pulled apart, the hologram will fracture with the part of the hologram covered by the hologram/barrier adhesive layer remaining attached to the barrier layer and the part of the hologram not covered by the hologram/barrier adhesive layer remaining attached to its support sheet. Such fracturing produces an immediate change in the appearance of the hologram when an attempt is made to tamper with the laminar structure. For example, the hologram/barrier adhesive layer may be so shaped that the areas not covered by the adhesive layer form the word "VOID", thus providing an automatic indication of the invalidity of a card which has been tampered with.

The adhesive used to attach the barrier layer to the photograph may be any adhesive capable of producing a strong bond between these two elements, but should preferably be a water-remoistenable adhesive so that the adhesive is rendered tacky by the moisture in the wet photograph. Desirably, this adhesive is selected from those adhesives which have hitherto been used to adhere wet photographs to the protective outer sheets in conventional identity cards and similar laminar structures. Preferred adhesives are those described in the aforementioned U.S. Pat. No. 3,647,442, which comprise a hydroxylated polymer selected from the group consisting of polyvinyl alcohols, hydrolyzed polyvinyl acetates and hydrolyzed cellulose esters. An especially preferred adhesive of this type comprises a mixture of polyvinyl alcohol and poly(4-vinylpyridine). Alternatively, the photograph/barrier adhesive layer may comprise a methyl vinyl ether/maleic anhydride copolymer or a partial lower alkyl ester of such a copolymer, as described for example in U.S. Pat. Nos. 3,498,788 and 3,581,416

The first and second sheets used in the present invention may be formed from any of the materials used in prior art identity cards and similar laminar structures. Such materials are well known to those skilled in the art and are described, for example, in the aforementioned U.S. Pat. Nos. 3,644,116 and 3,647,442. Preferably the first and second sheets are formed from a polyester, although other polymers, for example polyvinyl chloride or polyvinyl chloride/polyvinyl acetate may also be employed. The thickness of the first and second sheets can vary, as in conventional identity cards and similar laminar structures. For example, sheets having thicknesses in the range of about 1 to about 20 mils may be employed, with a thickness of about 10 mils typically being employed.

The surfaces of at least one of the first and second sheets facing the hologram and the photograph desirably carry a substantially transparent layer of a heat activateable adhesive, for example an ethylene ethyl acrylate copolymer or an ethylene vinyl acetate copolymer. Furthermore, on the first sheet, this layer of heat activateable adhesive is preferably covered with a hydroxylated polymer selected from the group consisting of polyvinyl alcohols, hydrolyzed polyvinyl acetates and hydrolyzed cellulose esters; a particularly preferred material of this type comprises a mixture of polyvinyl alcohol and poly-4-vinyl pyridine. During lamination, this mixture provides an excellent security seal between the first sheet and those parts of the wet photograph which are not covered by the hologram and the barrier layer.

Although reference has been made herein to first and second sheets, it will be appreciated that the first and second sheets need not be physically separate sheets. For example, the first and second sheets could be provided by folding a single piece of material in half, thereby permitting the hologram and the photograph to be placed between the two folded halves. The first and second sheets could also be provided by an envelope structure comprising front and rear protective sheet components sandwiching a frame member having a well opening suitable to accommodate a photograph. Such an envelope structure is described in U.S. Pat. No. 4,330,350.

In many cases, it is convenient to adhere the supported hologram and the barrier layer to the first sheet prior to the lamination, thereby enabling the laminar structure to be formed simply be inserting the photograph between the first and second sheets and laminating the two sheets together, in the same manner as in the production of a conventional identity card.

Conventional laminar structures used as identity cards typically comprise both a photograph of the bearer and data relating to the bearer, such as the bearers name and signature, as illustrated for example in FIG. 1 of the aforementioned U.S. Pat. No. 3,614,839. When the present invention is used to produce such an identity card, for maximum security it is desirable that the hologram cover both a portion of the photograph and a portion of the data, in order to ensure that neither photograph nor data can be changed without visible damage to the hologram.

As already mentioned, during the lamination step of the present process, the hologram becomes sufficiently adhered to the photograph that, if an attempt is made to separate the hologram from the photograph, fracture will occur within the hologram or between the hologram and its support sheet, so that at least part of the hologram will remain attached to the photograph; desirably, the fracture either occurs within the hologram itself, or between the hologram and its support sheet, thereby either destroying the hologram or rendering it (in practice) impossible to peel the very thin hologram away from the photograph, since the bare hologram is effectively impossible to grip and too weak to retain its integrity once separated from its support sheet. It is of course necessary to adjust the strengths of the various adhesive layers in the laminar structure to ensure that fracture occurs in this manner. In particular, the strengths of the bonds between the hologram and the barrier, and between the barrier layer and the photograph, should be greater than the strengths of the bonds between the hologram and its support sheet, and between the photograph and the second sheet.

A preferred laminar structure of the invention, and the process for its preparation, will now be described, though by way of illustration only, with reference to the accompanying drawing, which shows a schematic side elevation of the laminar structure as it is being assembled, the structure being viewed from along one long edge of the final rectangular structure. The thicknesses of the various layers shown in the drawing are not to scale, and all thicknesses are greatly exaggerated relative to the width of the laminar structure.

The laminar structure (generally designated 10) shown in the drawing is an identity card comprising a first sheet 12 formed of a substantially transparent polyester film. Although only the portion of the sheet 12 overlying the hologram and the photograph need be transparent, to avoid alignment problems, it is preferred that the entire sheet 12 be transparent. On its inner surface the sheet 12 is provided with a thin heat-activateable adhesive layer 14 formed from an ethylene ethyl acrylate or ethylene vinyl acetate copolymer, and with a layer 16 comprising a mixture of polyvinyl alcohol and poly-4-vinyl pyridine (a methyl vinyl ether/maleic anhydride copolymer or a partial lower alkyl ester of such a copolymer could alternatively be used in place of the mixture of polyvinyl alcohol and poly-4-vinyl pyridine).

A support sheet adhesive layer 18, formed from a low-melting polyester adhesive and having a thickness of about 0.25 mil, secures a supported hologram to the first sheet 12. This supported hologram comprises a support sheet 20 formed of polyethylene terephthalate about 1.5 mil thick and a hologram 22. This hologram 22 is a reflection phase-volume hologram approximately 6 $\mu$m thick.

The surface of the hologram 22 remote from the support sheet 20 is covered by a hologram/barrier adhesive layer 24 formed from a heat-activateable polyester or ethylene vinyl acetate adhesive. This adhesive layer 24 adheres the hologram 22 to a barrier layer 26. As already noted, if desired this adhesive layer 24 need only cover part of the surface of the hologram 22 facing the barrier layer 26, so that the uncovered part of the hologram does not adhere to the barrier layer 26.

The barrier layer 26 is substantially impermeable to water vapor and transparent, being formed from a vinylidene chloride copolymer (sold commercially under the tradename "SARAN") and is approximately 0.75 mil thick. (As noted above, polychlorotrifluoroethylene, for example that sold under the tradename "ACLAR", may alternatively be used as the barrier layer 26, and when this chlorofluorocarbon polymer is used, it is often necessary to provide a priming layer on the surface of the barrier layer facing the photograph in order to provide the barrier layer with surface characteristics which enable it to be securely adhered to the wet photograph.) The barrier layer 26 is itself covered by an adhesive layer 28.

The remaining components of the laminar structure are a wet photograph 30, and a second sheet 32 provided on its inner surface with a layer 34 of heat-activateable adhesive similar to the layer 14 on the first sheet 12. The second sheet 32 can be formed from the same polyester film as the first sheet 12.

Although the layers 18-28 can be provided separately from the sheet 12, and all the components of the laminar structure laminated together in a single operation (and indeed, if desired the barrier layer can be provided as a unit separate from the hologram if desired), it is convenient to attach the layers 18-28 to the sheet 12 before attaching the sheet 12 to the photograph and the second sheet, as shown in the drawing. Once the layers 18-28 have been attached to the sheet 12, only the sheet itself needs to be handled, thus avoiding problems with handling the adhesive surface of the adhesive layers 18 and 28 and avoiding damage to the relatively fragile hologram 22. Furthermore, the first sheet 12 with the layers 18-28 attached thereto can be handled in exactly the same manner as the first sheet of a conventional laminar structure without a hologram attached, and the lamination effected in the conventional manner without any need to modify the apparatus required.

The photograph 30 is desirably prepared by a dye diffusion transfer photographic process such as that described in U.S. Pat. No. 2,983,606. The photographic system described in this patent provides a photograph of the bearer along with descriptive information in the camera so that both the subject and the descriptive matter are simultaneously photographed to provide a single developable image. The developable image is then processed to provide a transfer print comprising a suitable support having thereon an image-bearing layer containing a likeness of the subject at one portion thereof and the descriptive matter at another portion thereof.

Thus, the intended bearer of an identity card will report to an identity card issuance station where appropriate photographic materials and equipment are assembled. A data card containing personalized information relating to the bearer is prepared, usually by adding such information to a preprinted data card bearing information pertaining to the card issuing authority or association. The data card and the bearer are photographed simultaneously with a camera unit employing diffusion transfer photographic film (comprising a photosensitive element, an image receiving element and a rupturable pod containing photographic processing composition for distribution between such elements after photoexposure). The preparation of a photographic print in the aforementioned manner can be accomplished most expeditiously using a Polaroid Land Identification System equipped with a diffusion transfer color film unit available from Polaroid Corporation under the trademark Polacolor. However, other methods for preparing photographic information-bearing cards can be used.

The resultant photograph is then placed, while still wet, between the first sheet 12 with the layers 18-28 attached thereto, and the second sheet 32, and all the components of the laminar structure laminated together. This lamination is preferably effected by heat sealing, although other methods, such as pressure sealing, can be used if desired.

The heat sealing causes the first sheet 12 and the second sheet 32 to be welded together around their peripheries, thereby forming a sealed pouch enclosing the remaining components of the laminar structure. The heat sealing also causes the adhesive layer 28 to bond the barrier layer 26 and the hologram 22 firmly to the wet photograph 30, and causes the portions of the photograph 30 which extend beyond the periphery of the hologram 22 to bond via the layer 16 to the first sheet 12. (As will be seen in the drawing, the sizes of the hologram, photograph and the first and second sheets are chosen so that portions of the photograph extend beyond the periphery of the hologram, and portions of the first and second sheets extend beyond the periphery of the photograph, thereby leaving peripheral areas of the photograph and the first and second sheets free to bond as described above.)

The resultant laminar structure is viewed from above (as seen in the drawing) and displays the hologram superimposed upon the photograph. To provide maximum protection against tampering, the strengths of the various adhesive layers in the laminar structure are adjusted to ensure that, if an attempt is made to separate the hologram from the photograph, fracture will occur within the hologram 22 or between the hologram 22 and its support sheet 20, so that at least part of the hologram will remain attached to the photograph, and it is not thereafter possible to peel the hologram from the photograph. This effectively prevents removal of the hologram from the photograph and substitution of a different photograph below the same hologram.

It will thus be seen that the process of the present invention enables a wet photograph to be incorporated into a laminar structure together with a hologram, with the laminar structure having a high resistance to tampering by separation of the hologram from the photograph. Furthermore, the present process can readily be carried out with the apparatus used for producing similar prior art laminar structures.

We claim:
1. A laminar structure comprising:
   a first sheet at least a portion of which is substantially transparent;
   a supported hologram comprising a hologram disposed on a support sheet with the support sheet disposed adjacent one surface of the first sheet;
   a substantially moisture-impermeable barrier layer secured to the surface of the hologram remote from the support sheet;
   a photograph;
   an adhesive layer lying between and adhered to the photograph and the barrier layer, the adhesive layer comprising a material capable of adhering the barrier layer to the photograph while the photograph is still wet; and
   a second sheet adhered to the first sheet such that the supported hologram, barrier layer, adhesive layer and photograph lie between the first and second sheets, such that the hologram and the photograph can be viewed through the substantially transparent part of the first sheet, and the hologram is sufficiently adhered to the photograph that if an attempt is made to separate the hologram from the photograph, fracture will occur within the hologram or between the hologram and the support sheet, so that at least part of the hologram will remain attached to the photograph.

2. A laminar structure according to claim 1 further comprising a support sheet adhesive layer disposed on the opposed side of the support sheet from the hologram and adhering the supported hologram to the first sheet.

3. A laminar structure according to claim 1 wherein the hologram is a volume hologram.

4. A laminar structure according to claim 3 wherein the hologram has a thickness of not more than about 10 microns.

5. A laminar structure according to claim 1 wherein a heat-activateable hologram/barrier adhesive layer is provided between the hologram and the barrier layer, the hologram being adhered to the barrier layer by the hologram/barrier adhesive layer.

6. A laminar structure according to claim 5 wherein the heat-activateable hologram/barrier adhesive layer comprises a polyester or ethylene vinyl acetate adhesive.

7. A laminar structure according to claim 5 wherein the heat-activateable hologram/barrier adhesive layer covers only part of the surface of the hologram facing the barrier layer, such that if the hologram and the photograph are pulled apart, the hologram will fracture with the part of the hologram covered by the hologram/barrier adhesive layer remaining attached to the barrier layer and the part of the hologram not covered by the hologram/barrier adhesive layer remaining attached to the support sheet.

8. A laminar structure according to claim 1 wherein the first sheet carries, on its surface facing the hologram, a substantially transparent layer of a hydroxylated polymer selected from the group consisting of polyvinyl alcohols, hydrolyzed polyvinyl acetates and hydrolyzed cellulose esters, or a methyl vinyl ether/maleic anhydride copolymer or a partial lower alkyl ester of such a copolymer.

9. A laminar structure according to claim 1 wherein the adhesive layer comprises a hydroxylated polymer selected from the group consisting of polyvinyl alcohols, hydrolyzed polyvinyl acetates and hydrolyzed cellulose esters, or a methyl vinyl ether/maleic anhydride copolymer or a partial lower alkyl ester of such a copolymer.

10. A laminar structure according to claim 1 wherein the barrier layer comprises a copolymer of vinylidene chloride or a chlorofluorocarbon polymer.

11. A laminar structure according to claim 1 wherein the barrier layer comprises a copolymer of vinylidene chloride with vinyl chloride, acrylonitrile or a methacrylate, or a polychlorotrifluoroethylene.

12. A laminar structure according to claim 1 wherein the first and second sheets are heat-sealed to one another around their edges, thereby forming a closed pouch containing the hologram and the photograph.

13. A process for incorporating a supported hologram into a laminar structure which also comprises first and second sheets and a wet photograph, at least a portion of the first sheet being substantially transparent, said supported hologram comprising a hologram disposed on a support sheet, which process comprises:

providing on the surface of the hologram remote from the support sheet a substantially moisture-impermeable barrier layer;

providing, on the opposed side of the barrier layer from the hologram, an adhesive layer capable of adhering the hologram and barrier layer to a wet photograph;

bringing together the first and second sheets, the wet photograph, the supported hologram and the barrier and adhesive layers with the photograph being disposed adjacent the second sheet, the adhesive layer being disposed adjacent the photograph and the supported hologram being disposed adjacent the first sheet; and laminating the first and second sheets, the wet photograph, the supported hologram and the barrier and adhesive layers together, such that the first and second sheets are bonded together and the hologram and the photograph can be viewed through the substantially transparent part of the first sheet, and the hologram becomes sufficiently adhered to the photograph that if an attempt is made to separate the hologram from the photograph, fracture will occur within the hologram or between the hologram and the support sheet, so that at least part of the hologram will remain attached to the photograph.

14. A process according to claim 13 wherein a support sheet adhesive layer is provided on the opposed side of the support sheet from the hologram, such that after the lamination the support sheet and the hologram are adhered to the first sheet by the support sheet adhesive layer.

15. A process according to claim 13 wherein the support sheet has a thickness in the range of about 6 to about 80 microns.

16. A process according to claim 13 wherein the support sheet comprises a polyester.

17. A process according to claim 16 wherein the support sheet comprises polyethylene terephthalate.

18. A process according to claim 13 wherein the second adhesive layer comprises a polyester adhesive.

19. A process according to claim 13 wherein the hologram is a volume hologram.

20. A process according to claim 19 wherein the hologram has a thickness of not more than about 10 microns.

21. A process according to claim 13 wherein a heat-activateable hologram/barrier adhesive layer is provided between the hologram and the barrier layer, such that after the lamination the hologram is adhered to the barrier layer by the hologram/barrier adhesive layer.

22. A process according to claim 21 wherein the heat-activateable hologram/barrier adhesive layer comprises a polyester or ethylene vinyl acetate adhesive.

23. A process according to claim 21 wherein the heat-activateable hologram/barrier adhesive layer covers only part of the surface of the hologram facing the barrier layer, such that if after the lamination the hologram and the photograph are pulled apart, the hologram will fracture with the part of the hologram covered by the hologram/barrier adhesive layer remaining attached to the barrier layer and the part of the hologram not covered by the hologram/barrier adhesive layer remaining attached to the support sheet.

24. A process according to claim 13 wherein the first and second sheets comprise a polyester.

25. A process according to claim 13 wherein the first sheet carries, on its surface facing the hologram, a substantially transparent layer of a hydroxylated polymer selected from the group consisting of polyvinyl alcohols, hydrolyzed polyvinyl acetates and hydrolyzed cellulose esters or a methyl vinyl ether/maleic anhydride copolymer or a partial lower alkyl ester of such a copolymer.

26. A process according to claim 13 wherein the adhesive layer comprises a hydroxylated polymer selected from the group consisting of polyvinyl alcohols, hydrolyzed polyvinyl acetates and hydrolyzed cellulose esters, or a methyl vinyl ether/maleic anhydride copolymer or a partial lower alkyl ester of such a copolymer.

27. A process according to claim 13 wherein the barrier layer comprises a copolymer of vinylidene chloride or a chlorofluorocarbon polymer.

28. A process according to claim 27 wherein the barrier layer comprises a copolymer of vinylidene chloride with vinyl chloride, acrylonitrile or a methacrylate, or a polychlorotrifluoroethylene.

29. A process according to claim 13 wherein the supported hologram and the barrier layer are adhered to the first sheet prior to the lamination.

30. A process according to claim 13 wherein the first and second sheets are heat-sealed to one another around their edges, thereby forming a closed pouch containing the hologram and photograph.

31. A laminar structure produced by a process according to claim 13.

* * * * *